INVENTOR.
LESTER H. LEE
BY Robert S. Clay
ATTORNEY

INVENTOR.
LESTER H. LEE
BY Robert S. Clay
ATTORNEY

United States Patent Office 3,435,245
Patented Mar. 25, 1969

3,435,245

PHOTOCELL POSITION SENSOR HAVING MASKS FOR LINEARIZING PHOTOCELL

Lester H. Lee, Mountain View, Calif., assignor to Ampex Corporation, Redwood City, Calif., a corporation of California Filed July 25, 1966, Ser. No. 567,761
Int. Cl. H01j *1/56;* G01d *5/34*
U.S. Cl. 250—219 8 Claims

ABSTRACT OF THE DISCLOSURE

A photosense arrangement for position sensing devices to continuously sense the position of a variable position element. A planar photosense element is placed along one side of the path of the element and a parallel light source is positioned such that the variable position element interrupts the light path between the source and the photosense means to a variable extent dependent upon its position. The signal generated from the photocell is made linear by further interposing a mask of predetermined shape along the length of the photocell.

This invention relates to position sensing systems using photosensitive elements, and particularly to loop position sensors for magnetic tape transports.

The problem of sensing the position of a variable position member without affecting the member itself is now encountered in many modern applications. Typically, the position of the member is sensed and a signal is generated for application to servo circuits that operate an appropriate motor or device to maintain the member at a selected position, or within a chosen range of positions. Where precise control or high speed is involved, electronic sensing means are generally employed in order to obtain the necessary system response rate.

An apt example of the type of critical environment in which precise control of a variable length member is required is found in magnetic tape transports, although like requirements are increasingly being found elsewhere and the invention is applicable to all such situations. In magnetic tape transports, particularly in digital transports in which the tape is driven intermittently and bidirectionally with high acceleration and deceleration rates, it is often necessary to interpose some speed buffering mechanism between the drive system and the relatively high inertia reels that comprise the tape supply and takeup means. Rectangular chambers having an open end and a closed end are positioned between each reel and the drive mechanism, with a pressure differential being maintained between these two ends, as by a vacuum outlet near the closed end. The transverse cross-sectional dimension of the chamber is only slighly greater than the width of a tape looped within it, to permit free tape movement without excessive air leakage. The tape loop length in the chamber is then sensed by some suitable means, and a servo drive motor for the adjacent reel is operated in accordance with the loop length and other significant conditions of the tape so as to maintain control of the tape loop irrespective of high speed reversals of tape motion by the drive system.

Many different mechanisms have been employed for sensing the tape loop condition and exrecising the desired servo control, and these mechanisms have used bang-bang as well as linear servo techniques. For bang-bang servo systems, discretely separated photocells are disposed along the chamber, with opposed light sources being mounted so that light paths directed from the sources toward the individual photocells are intercepted by the tape loop. Systems of this nature are inherently difficult to stabilize, so that for better stability additional position sensors and tape velocity sensors are generally used despite the added expense. Nevertheless, such servos are widely used, because of the problems heretofore involved in obtaining a precise linear loop length sensor. Linear systems have been developed utilizing a number of techniques, including capacitance sensing and pneumatic sensing as well as the photosense approach. The capacitive sensing systems have been complicated, expensive and unreliable, and the pneumatic systems have been characterized by high noise levels and inherently slower response than the photosense systems. Considerable attention has been paid to the photosense systems, and these typically use an array of light sources on one side of the tape loop and an array of photocells on the other. By coupling the photocells in parallel, the total current generated and passed through a load resistor is made representative to some approximate degree of the loop length.

Difficulty still remains, however, in achieving satisfactory linearity in the generated signal. Photocells do not have linear characteristics, particularly when operated from nonexcitation to full excitation conditions. Planar cells, such as the widely used silicon solar cells, are not uniform throughout their areas. The cells can be closely matched by careful selection, or electrical compensation networks can be used. Either expedient is time consuming and relatively costly.

It is therefore an object of the present invention to provide an improved photosensing arrangement for use in position sensing devices.

Another object of the present invention is to provide an improved photosense arrangement for linear reel servos in magnetic tape transports.

These and other objects are achieved in accordance with the invention by disposing a planar photosense element along one side of the path of the variable position element to be sensed, and disposing a parallel light source such that the variable position element interrupts the light path between the source and the photosense means to a variable extent dependent upon its position. The signal generated from the photocell is made linear, however, by further interposing a mask of predetermined shape along the length of the photocell. In a specific example of a vacuum chamber system for a magnetic tape transport, for example, the planar photocell is disposed along one side wall, and is itself masked. A substantially planar light source, either a fluorescent light or a series of light bulbs, is mounted in another wall of the chamber. With this arrangement, a linear output signal is generated, with the degree of linearity being such that the signal may be differentiated to provide a signal accurately representing rate of loop change. This type of servo system is easily mechanized and highly stable.

A better understanding of the invention may be had by reference to the following description, taken in conjunction with the accompanying drawings, in which.

Figure 1:
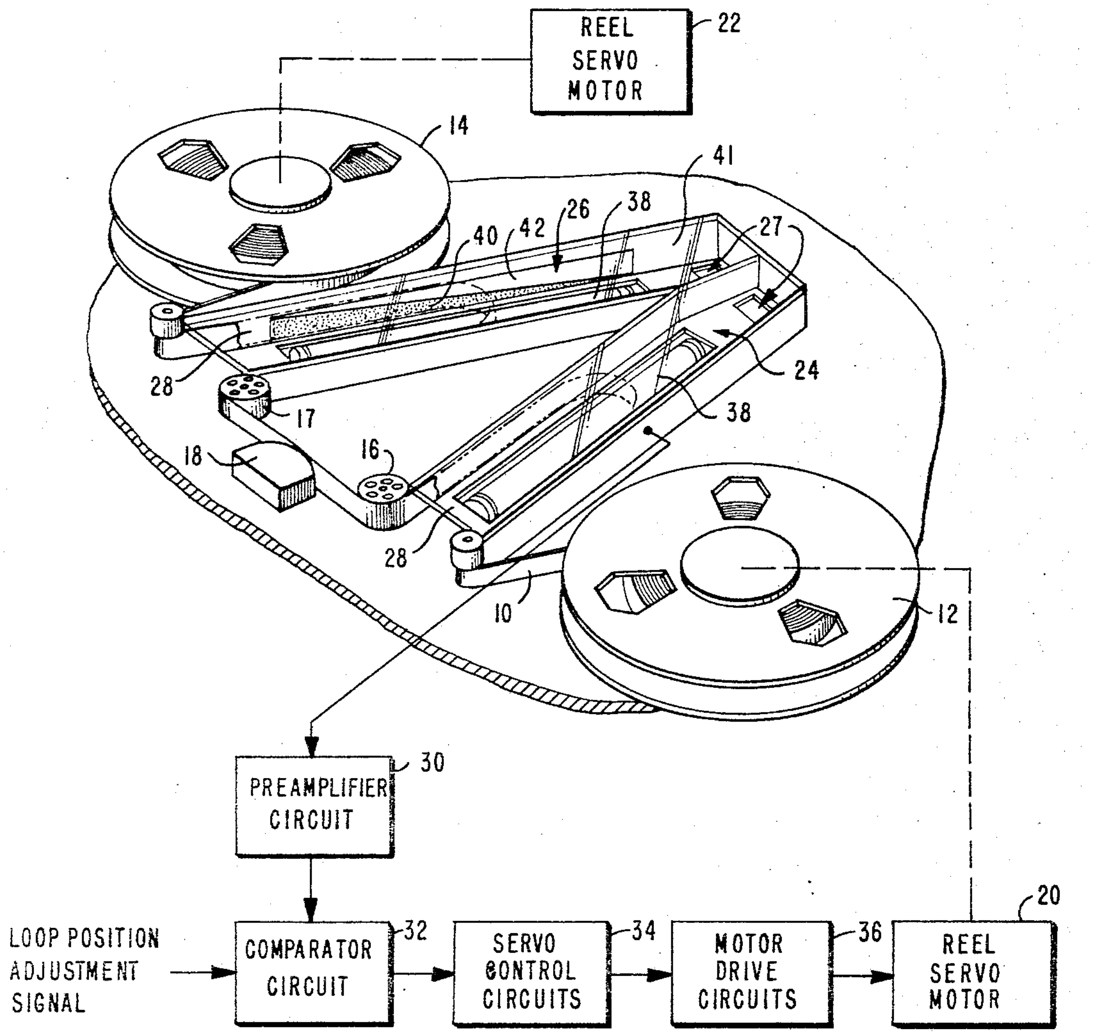
FIG. 1 is a combined block diagram and perspective representation, in simplified form and partially broken away, of a photosense system in accordance with the invention as used in a digital magnetic tape transport.

In FIG. 1 is represented a digital magnetic tape transport of a type now widely employed, in which a tape 10 is fed between a supply reel 12 and a takeup reel 14. A drive mechanism, here comprising a pair of bidirectionally driven capstans 16, 17 operated by a direct drive system from a high torque-to-inertia ratio motor (not shown) accelerates the tape 10 to and from high speeds in either direction within a few milliseconds, permitting recording and reproduction to be undertaken at a magnetic head assembly 18. Reel servo motors 20, 22 individually drive the supply and takeup reels 12, 14 respectively, in response to the loop cndition in each of two vaccum chambers 24, 26. The vacuum chambers 24, 26 are of rectangular cross-section, having a depth (as seen in plan view) only slightly greater than the transverse tape width, an open end adjacent the drive mechanism, and an opposite closed end with an outlet 27 coupled to a vacuum source (not shown). The front broad walls 28 of the chambers 24, 26 are transparent so that the internal loop may be viewed by an operator. The photosense system for the reel servos, in accordance with the invention, provides a signal to DC preamplifier circuit 30. The preamplified signal is applied to a comparator 32, which also receives a separate loop position adjustment signal serving as a reference. This loop position adjustment signal may be fixed or may be varied to provide optimum loop lengths for particular conditions of operation. The term "comparator circuit" is intended to designate all techniques for referencing a variable signal to some level, including techniques using bias levels at the input to an amplifier. The difference signal from the comparator 32, which may also be regarded as the referenced signal, is applied to the servo control circuits 34. These may, in conventional fashion, use an operational amplifier with differentiating circuits for generating a signal component representative of rate of change of loop length. The output signal from the servo control circuits 34 is then coupled to motor drive circuits 36 driving the associated reel motor 20. These drive circuits may be of any conventional form, such as those using SCRs for controlling motor energization.

Figure 2:
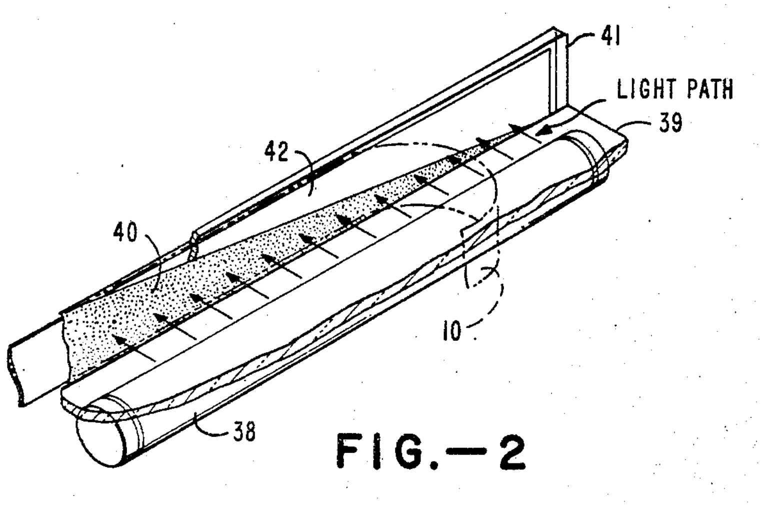
FIG. 2 is an enlarged fragmentary perspective of a portion of the arrangement of FIG. 1, showing further details of the photosense arrangement.

Further details of the photosense system in accordance with the invention are shown in FIG. 2, as well as in FIG. 1. FIG. 2 represents a partial representation of the chamber 26 of FIG. 1, but it will be understood that the chambers are alike. The light energy is provided from a substantially planar light source 38, here a fluorescent light disposed longitudinally along the rear broad wall of the vacuum chamber 26. The front broad wall may also be used, but if used it is generally preferred to dispose the elements so that the tape loop is visible through the transparent front wall. The rear wall 39 of the chamber 26 is made of a transparent material at least in the region of the light source 38. The photosensitive device 40 is disposed behind an adjacent interior side wall 41 of the vacuum chamber 26. Here the photosensitive device 40 is a single planar photocell element. Between the photosensitive device 40 and the light source 38 is interposed a shaped photo mask 42. The term "interposed" is not limited to the case where the photomask means is in an intermediate position. Thus the photo mask is interposed between the photosensitive device 40 and the light source 38 whether the mask is disposed in or on the photosensitive or the light source. The mask 42, here to approximately triangular shape, and having one side on an approximate diagonal across the photosensitive device 40, may be any suitably light reflective or opaque material. The side wall 41 serves to provide a uniform surface for contacting the tape 10, without developing a static charge or attenuating the light transmission from the source 38.

As previously indicated, variations throughout the surface of the photosensitive device 40 can be substantial. Once the mask 42 is installed, however, the device 40 operates in consistent fashion. The variable masking effect of the tape 10 loop combined with the predetermined masking effect of the fixed mask 42, is arranged to provide a current from the photosensitive device 40 that varies linearly with loop length. The mask 42, here roughly triangular in shape and with its hypotenuse on a diagonal across the photosensitive device 40, can also compensate for effects of impinging ambient light and inherent cell non-linearities.

Figure 3:
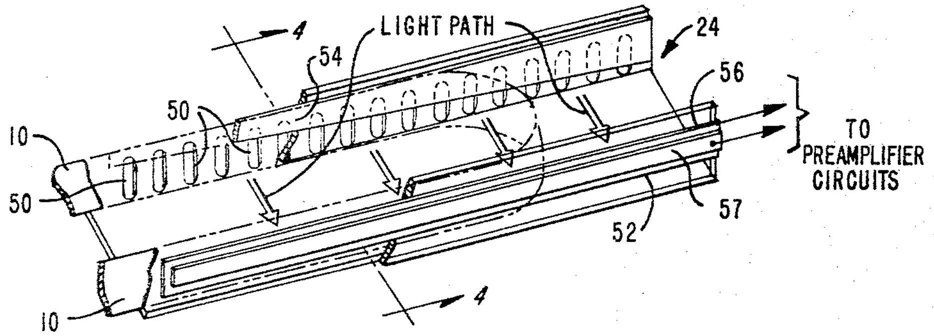
FIG. 3 is a fragmentary perspective of a different photosense arrangement in accordance with the invention.
Figure 4:
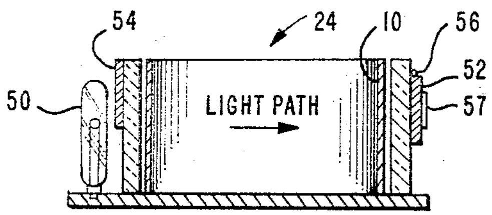
FIG. 4 is an end sectional view of the arrangement of FIG. 3.

A different arrangement in accordance with the invention is shown in FIGS. 3 and 4. FIGS. 3 and 4 show only the photosense portion of a tape transport system such as that illustrated in more detail in FIG. 1. Furthermore, the vacuum chamber is illustrated only in idealized and fragmentary form.

In FIGS. 3 and 4, light sources 50 and light sensitive cells 52 are disposed in opposite narrow walls of the vacuum chamber 24. The light sources 50 comprise a longitudinally disposed array of incandescent bulbs, spaced so as to create an essentially planar light source effect for the oppositely disposed cells 52. Those skilled in the art will recognize that other lamp and photocell combinations are feasible. In one such arrangement, not shown, the photocell may be positioned in the front wall of the vacuum chamber, facing inwardly, with the light source disposed in the side wall of said chamber. In yet another arrangement, not shown, the photocell is positioned at the back wall and a light source is positioned in one of the side walls of the vacuum chamber. The uniformity of light distribution which is connoted by the term "planar light source" may be enhanced by the use of a translucent panel or some other light diffusing arrangement, if desired. A mask 54 of reflective or opaque material is disposed adjacent the light sources, and interposed in the light path between the light sources 50 and the cells 52. The mask has a predetermined shape, as previously stated, suitable for linearizing the output from the cells 52 for varying positions of the tape 10 loop length intervening between the light sources 50 and the cells 52.

The light sensitive cells 52 themselves are disposed, in this arrangement, in the form of a longitudinal array of parallel connected solar cells, such as silicon or selenium cells. The light sensitive cells may generally be referred to as "planar photosensitive elements." Such cells as are in use today are typically of silicon, but could be of any other photosensitive material. The solar cell might efficiently and economically consist of an array of discrete photosensitive elements, rather than of one or more continuous planar elements. The number and size of such discrete elements of a photosensitive array should be such that the interposition of photomask means between the light source and the photosense arrangement, together with the loop length variation, result in the generation of an analog signal of a substantially continuous characteristic. Commercially available products of this nature are sold in the form of an elongated rectangle, with a conductive bead 56 (FIG. 4) forming one terminal being disposed along one edge, and a Kovar strip 57 forming the other terminal and affixed to the unexposed broad face of the silicon cell. Transverse conductors (not shown) extending from the edge bead 56 may be utilized to provide a greater length of line contact between the first terminal and the exposed surface of the cell. An array of elongated rectangular cells of this nature may then be assembled simply by placing the cells end to end for the desired total length, and providing a conductive connection between the abutting terminals.

As in the arrangement of FIGS. 1 and 2, the combined effect of the intervening tape loop and the interposed mask 54 is to produce changes in the output current signal from the solar cell array which are linear with loop length in the chamber.

While various linear photosense arrangements for position sensing devices have been described above, it will be appreciated that the invention is not limited thereto, but includes all other forms and modifications falling within the scope of the appended claims.

What is claimed is:

1. A photosense arrangement for position sensing devices comprising:

means comprising a substantially planar light source position along the path of movement of a variable position device to be sensed;

means defining a substantially planar photosense arrangement positioned on a different side of the path of movement of the variable position device to be sensed, and such as to receive light from the light source to an extent determined by the position of the variable position device; and stationary photomask means interposed between the light source and the photosense arrangement, and having a predetermined pattern blocking at least a portion of the light transmitted between said light source and said photosense arrangement, such that the position of the variable position device and the configuration of the mask result in a substantially linear variation in the signal generated from the photosense arrangement, in accordance with the position of the variable position device.

2. A linear photosense system for differential pressure chambers for magnetic tape transports, said differential pressure chambers being of the type having a rectangular cross section and broad and narrow walls, said system comprising:

means comprising a substantially planar light source positioned along one wall of the chamber;

means defining a substantially planar photosense arrangement positioned along a different wall of the chamber, and exposed to the light source to a variable length dependent upon the position of the loop in the chamber; and stationary photomask means interposed in the light path between the light source and the photosense means, and having a predetermined pattern blocking at least a portion of the light transmitted between said light source and said photosense arrangement in accordance with a predetermined characteristic, such that the position of the loop results in a substantially linear variation in the signal generated by the photosense arrangement.

3. The invention as set forth in claim 2 above, wherein said light source comprises a longitudinally disposed series of bulbs and said photomask means is disposed adjacent said photocells.

4. The invention as set forth in claim 2 above, wherein said light source and said photosense arrangement are disposed within adjacent walls of said chamber.

5. The invention as set forth in claim 2 above, wherein said light source comprises a fluorescent lamp disposed along one broad wall of said chamber, said cell comprises a planar, light-responsive surface disposed along an adjacent narrow wall of said chamber, and said photomask means comprises an opaque member disposed adjacent said cell.

6. The invention as set forth in claim 2 above, wherein said light source comprises an array of incandescent bulbs disposed along one side wall of said chamber, wherein said photosense arrangement comprises an array of silicon solar cells disposed along the opposite side wall of said chamber, said cells being connected in parallel, and wherein said photomask means is disposed adjacent said light bulbs.

7. A photosense arrangement for providing a linearly varying output current representative of the position of a loop in a vacuum chamber for a digital magnetic tape transport, comprising the combination of:

wall means defining a vacuum chamber having a substantially rectangular cross-section, said wall means including first and second transparent walls;

means positioned adjacent the first transparent wall of said vacuum chamber, outside of said chamber, for providing a substantially planar light source extending along at least a substantial portion of the length of said chamber;

means positioned adjacent the second transparent wall of said vacuum chamber, outside of said chamber, for providing a substantially planar light sensitive element therealong, said light sensitive element being disposed to receive light emanating from said light source to an extent determined by the position of the tape loop in the chamber; and stationary photomask means disposed on the surface of said photosensitive means and in the path of light from said light source, and having a pattern which with said tape loop, provides an output current variation from said cells that varies linearly with the position of the loop in said chamber.

8. The invention as set forth in claim 7 above, wherein said vacuum chamber has narrow and broad walls, wherein said light source comprises a plurality of light bulbs disposed along one of the narrow walls of said chamber, and wherein said light sensitive element comprises a plurality of solar cells disposed along the opposite side wall of said chamber, and coupled together in parallel.

References Cited

UNITED STATES PATENTS

| | | |
|---|---|---|
| 3,229,927 | 1/1966 | Cohler. |
| 3,244,954 | 4/1966 | Branco. |
| 3,261,564 | 7/1966 | Sharpe. |

RALPH G. NILSON, *Primary Examiner.*

MARTIN ABRAMSON, *Assistant Examiner.*

U.S. Cl. X.R.

250—237